(12) United States Patent  
Lambert et al.

(10) Patent No.: US 8,205,813 B2
(45) Date of Patent: Jun. 26, 2012

(54) METHOD FOR RECYCLING MATERIALS COMING FROM USED OBJECTS

(76) Inventors: Claude Lambert, Saint Michel sur Orge (FR); Jean-Michel Hachin, Levallois-Perret (FR)

( * ) Notice: Subject to any disclaimer, the term of this patent is extended or adjusted under 35 U.S.C. 154(b) by 381 days.

(21) Appl. No.: 12/302,279

(22) PCT Filed: May 16, 2007

(86) PCT No.: PCT/FR2007/000842
§ 371 (c)(1),
(2), (4) Date: Mar. 25, 2009

(87) PCT Pub. No.: WO2007/135280
PCT Pub. Date: Nov. 29, 2007

(65) Prior Publication Data
US 2009/0200212 A1 Aug. 13, 2009

(30) Foreign Application Priority Data
May 22, 2006 (FR) ...................... 06 04578

(51) Int. Cl.
*B02C 23/10* (2006.01)
(52) U.S. Cl. .......................................... 241/19; 209/3.3
(58) Field of Classification Search ................ 241/19, 241/24.12, 24.13, 24.14, 24.15, 24.18; 209/2–4
See application file for complete search history.

(56) References Cited

U.S. PATENT DOCUMENTS

| | | | | |
|---|---|---|---|---|
| 5,322,152 A * | 6/1994 | Tommila et al. | ............... | 194/212 |
| 6,216,878 B1 * | 4/2001 | Wheat | ............................ | 209/509 |
| 7,812,061 B2 * | 10/2010 | Isozaki | ............................ | 521/40 |

FOREIGN PATENT DOCUMENTS

| | | |
|---|---|---|
| DE | 3934969 A1 | 2/1991 |
| DE | 41 05 586 A1 | 8/1992 |
| DE | 10344861 A1 | 2/2005 |

* cited by examiner

*Primary Examiner* — Mark Rosenbaum
(74) *Attorney, Agent, or Firm* — Browdy and Neimark, PLLC

(57) ABSTRACT

The recycling method according to the invention involves, when manufacturing the objects (12), a preliminary phase of selectively labelling the objects (12), the parts of the objects and/or the components of the objects that include the materials to be recycled, and a phase of concentrating the recyclable materials involving grinding the objects (12) down into particles (15), remotely detecting the labels that may be borne by each of the particles, extracting those parts (26) in which a label has been detected and directing them to a storage area (27) specific to said label.

14 Claims, 2 Drawing Sheets

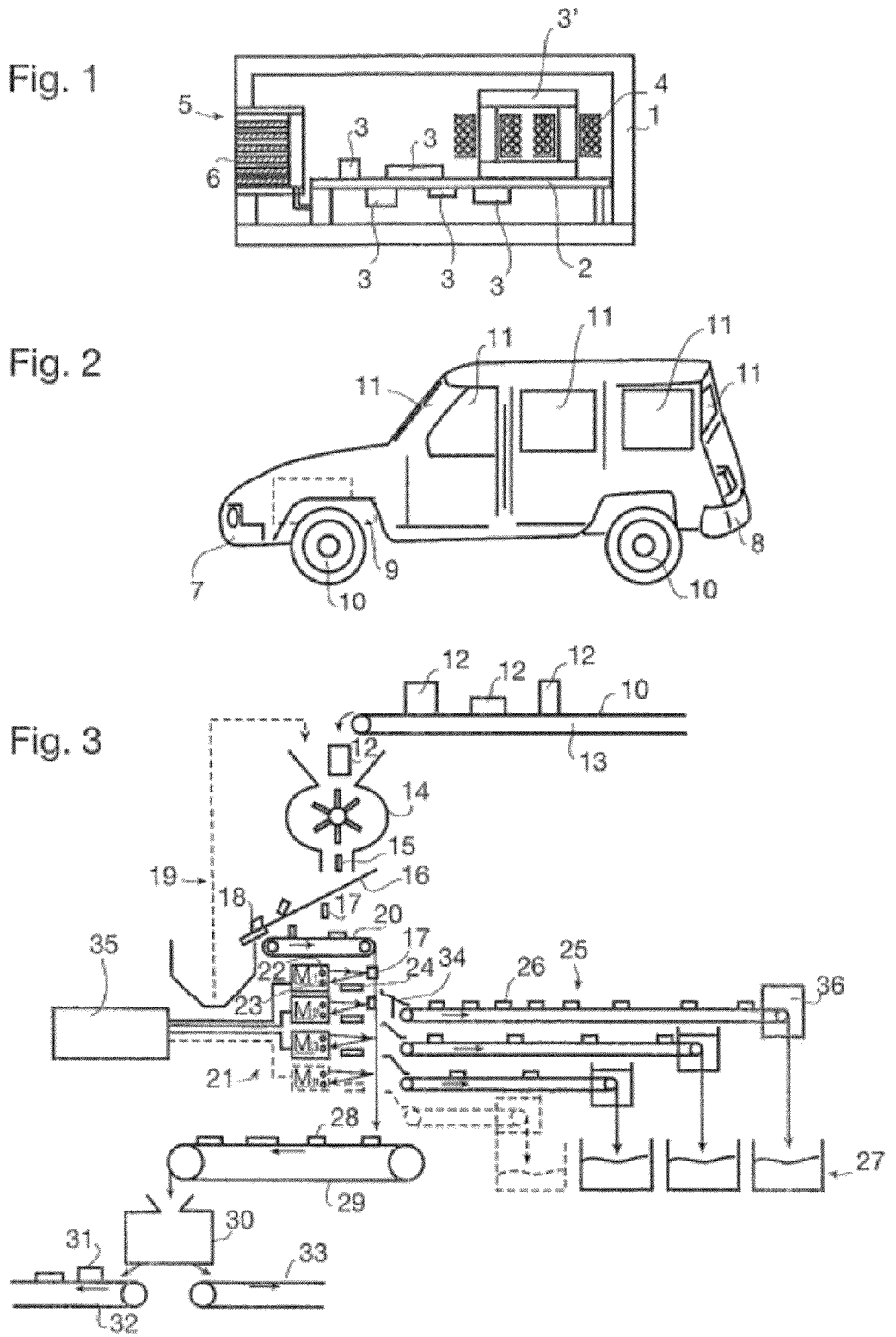

METHOD FOR RECYCLING MATERIALS COMING FROM USED OBJECTS

BACKGROUND OF THE INVENTION

1. Field of the Invention

The present invention concerns a method for recycling materials coming from used objects.

2. Description of the Prior Art

In general terms, it is known at present that great efforts are being made for the purpose of recycling, as much as possible, materials used in scrapped manufactured products.

Nevertheless, this problem is proving to be excessively difficult to resolve in the case where the product that it is wished to process with a view to recycling is complex in nature and comprises a multiplicity of parts produced from different materials.

OBJECT OF THE INVENTION

Such is in particular the case with electronic equipment or even motor cars.

In these two cases, the recycling involves dismantling the equipment and sorting the components, so as to collect together those that are produced from the same material.

It is clear that this process can be suitable only where cheap labour is used and does not lend itself to automated industrial applications.

In order to attempt to resolve these problems, it has been proposed to grind the equipment so as to reduce it to pieces of predetermined dimensions. These pieces are then the subject of selective sorting by conventional means, for example by flotation, magnetic sorting, etc. However, these methods do not cover the entire range of products. In particular, they do not make it possible to carry out selective sorting between various types of plastics material or to select a piece of apparatus including an electronic component containing a rare and/or precious material.

The aim of the invention is therefore more particularly to resolve this problem by virtue of a method for effecting a recycling of various materials liable to be present in a multiplicity of objects, independently of the nature of the said materials and/or of the said objects.

SUMMARY OF THE INVENTION

According to the invention, this method comprises an operating sequence comprising the following phases:

A preliminary phase in which a classification of the materials to be recycled is carried out, independently of the objects in which these materials are assumed to be present, with the allocation, for each of the materials classified, of an identification code signifying the presence of at least one specific chemical marker, detectable at a distance without contact, this preliminary phase also being able to comprise the entry and storage of spectrophotometric identification data for said markers.

A phase of selective marking of the objects, parts of objects and/or components of the objects including the materials to be recycled, in accordance with the allocation made according to said classification, this marking phase preferably being carried out during the manufacture of the object or even during a subsequent step in the life of the objects.

A phase of concentrating the materials to be recycled present in said objects, this phase comprising:

the grinding of the objects into particles of predetermined dimensions according to the nature of said objects and said components, the detection at a distance of the markers liable to be carried by each of the articles, the identification of the material to be recycled by virtue of the analysis of the marker and the extraction of the particles that were the subject of the detection and identification of a marker, and their switching into a storage area specific to said marker and therefore to said material to be recycled corresponding to this marker.

Advantageously:

the method can comprise, prior to the extraction phase, the allocation to the markers and therefore to the materials to be recycled of a classification by order of preference, so that, when several markers have been detected on the same particle, in switching this particle account is taken of the marker whose classification is the highest; conversely, it would be possible to proceed by elimination by rejecting the particles for which certain markers or combinations of markers have been identified, the markers can consist of chemical markers which, when they are excited by incident light radiation, emit energetic radiations, the frequency spectra of which are discernable with respect to one another and with respect to the objects and substances in which they are intended to be incorporated, the identification step can be carried out by spectrophotometric analysis of the particles of objects, components or materials issuing from the grinding, so as to detect the aforementioned parameters, in particular the presence or absence of markers and the determination of an identification code for the material to be recycled present in or on said particles.

In the method described above, the spectrophotometric analysis phase can comprise a sequence comprising the following steps:

the irradiation of the marked object or particle by means of a light beam with a broad frequency spectrum, the sending of the waves transmitted or reflected by the object or particle onto a dispersive element, which diverts them so as to obtain a light spectrum with a light intensity in different zones of the spectrum corresponding to different wavelength ranges, the detection of the light intensity in each of said zones, the comparison of this intensity with one or more threshold values specifically attributed to this zone and which were previously recorded in memory, the result of this comparison contributing to the determination of the identification code for the material to be recycled.

Moreover, the determination of the zones of the spectrum to be analysed, just like the various parameters allocated each of these zones, can be carried out by the system, from the aforementioned spectrophotometric identification data previously stored in memory. This solution makes it possible to obtain better reliability of the results and to considerably alleviate the power of the processing means used.

The parameters relating to the presence or absence of the markers in the combination attributed and used for the determination of an identification code can in particular include:

the presence or not of fluorescence, and/or a duration of fluorescence greater than or less than at least one threshold value, and/or the presence or absence of a peak at a pre-established wavelength as well as possibly the amplitude and/or the width of this peak, and/or emission peak heights corresponding to a concentration of markers greater than or less than one or more predefined threshold values.

In order to increase the number of combinations possible, different concentrations of markers are used to obtain different intensity lines.

In addition, in order to be free of all the optical factors liable to interfere with the reading and the subsequent spectrophotometric analysis, the light intensity emitted by the light radiation generator can be slaved according to the difference between the value of the light intensity detected in a predetermined frequency range not affected by the presence of the markers and a predetermined set value.

This measurement proves to be necessary when several intensity levels are used as parameters.

Advantageously, one of the markers present in an identification code can be used as a standard serving as a reference for determining the presence, absence and/or intensity of other markers, in particular with a view to effecting corrections and calibrations for being free from noise that may for example result from the composition of the substance or object, variations in positioning such as the angle of incidence, the distance to the object or transparent material enveloping or surrounding this substance or object, or a diminution in the signal due to the presence of foreign bodies (dirt, etc) or any diminution in the signal resulting from prolonged exposure to weather or from aging of the object.

Consequently, the method according to the invention can also comprise:
  the prior choice of one of the aforementioned markers and the allocation of this marker as a standard to a type of product or substance and/or for a predetermined period of time,
  the allocation to this marker of identification data and data specific to its function as standard and the storage of these data,
  during an authentication phase, the determination of the marker used as a standard, using identification data previously stored, the comparison of data relating to this standard marker obtained during the spectrophotometric analysis of the object or substance, with the aforementioned specific data previously stored,
  the calculation of a correction to be made to the spectrophotometric analysis from the result of this comparison,
  the detection of the presence, absence and/or intensity of the markers from the results of the corrected spectrophotometric analysis,
  the determination of the authentication code for the object or substance from the presence, absence and/or intensity of said markers.

One advantage of this solution consists of its permitting the use of very low concentrations (from a few ppm to a few hundreds, preferably a few tens of ppm or parts per million) of chemical markers each having a characteristic luminescent signal. Nevertheless, these concentrations may possible attain a few percent in the case of particular matrices, such as coloured or black. There results from this:
  the possibility of using, as chemical markers, nanomaterials, that is to say particles or structures whose size is measured in nanometres (or millionths of a metre). Use is made here of the property relating to the fact that, the smaller the size of the particles, the more the surface/volume ratio increases, and, consequently, the more significant is the spectrophotometric analysis.
  Having regard to the very small quantities used, the essential physical and chemical properties of the matrix in which the marker is added are unchanged.

For the same reason, the cost of the marker is low.

The markers can be:
  a) embedded in the mass: by way of example, these markers can be incorporated in a plastic matrix in which the marker may have the purpose of identifying the titer and grade of the polymer, the producer, the traceability, the authentication of the object, etc.
  b) disposed on the surface, for example:
    by impregnation (for example in a textile, a dye etc),
    by coating (deposition of varnish, paint, spraying) on various supports, for example metal aviation parts, whether this be on the whole of the surface or in isolation (screen printing, pad deposition),
    in the form of labels marked on the visible part or not.

Likewise, the identification code can be determined from the presence or absence of markers embedded in the mass and the presence or absence of markers disposed on the surface, for example in a coating such as a varnish or a paint.

Advantageously, this coating can comprise a reflective zone covered with a transparent layer containing markers. This solution thus makes it possible to carry out reflection spectrophotometry, which considerably reduces the energy losses.

The identification data can comprise the combination of markers chosen, the wavelengths of the characteristic lines, their intensity, the duration of any fluorescence etc.

Thus it is not necessary to cover all the wavelengths, it suffices to analyse the ranges of values corresponding to the lines expected, which are identified from the code of the spectrophotometric identification data previously stored in memory, in order to verify their presence or absence without being concerned with the zones situated outside these ranges.

In the case of the recycling of plastic, it can be envisaged using a combination of markers per type of plastic or per grade of plastic, which then makes it possible to sort them by type or grade once the identification has been made.

The aforementioned identification code can result from a combination of markers and can consist of a binary number, the binary figures of which each correspond to the presence or absence of a marker.

The invention is not limited to these various types of application.

Thus, in particular, the combination of markers can also make it possible to obtain identification data relating to the product itself, to its manufacture (for example its serial number), to the manufacturer and, possibly, to a distributor.

These arrangements will make it possible to ensure tracing of the marked objects or products.

BRIEF DESCRIPTION OF THE DRAWINGS

Embodiments of the invention will be described below by way of non-limitative examples, with reference to the accompanying drawings, in which:

FIGS. 1 and 2 are schematic view of two objects, certain constituent materials of which it is wished to recycle, FIG. 1 being a schematic cross-section of an electronic appliance and FIG. 2 being a side view of a motor car;

FIG. 3 is a block diagram of a recycling installation;

Figure 4:
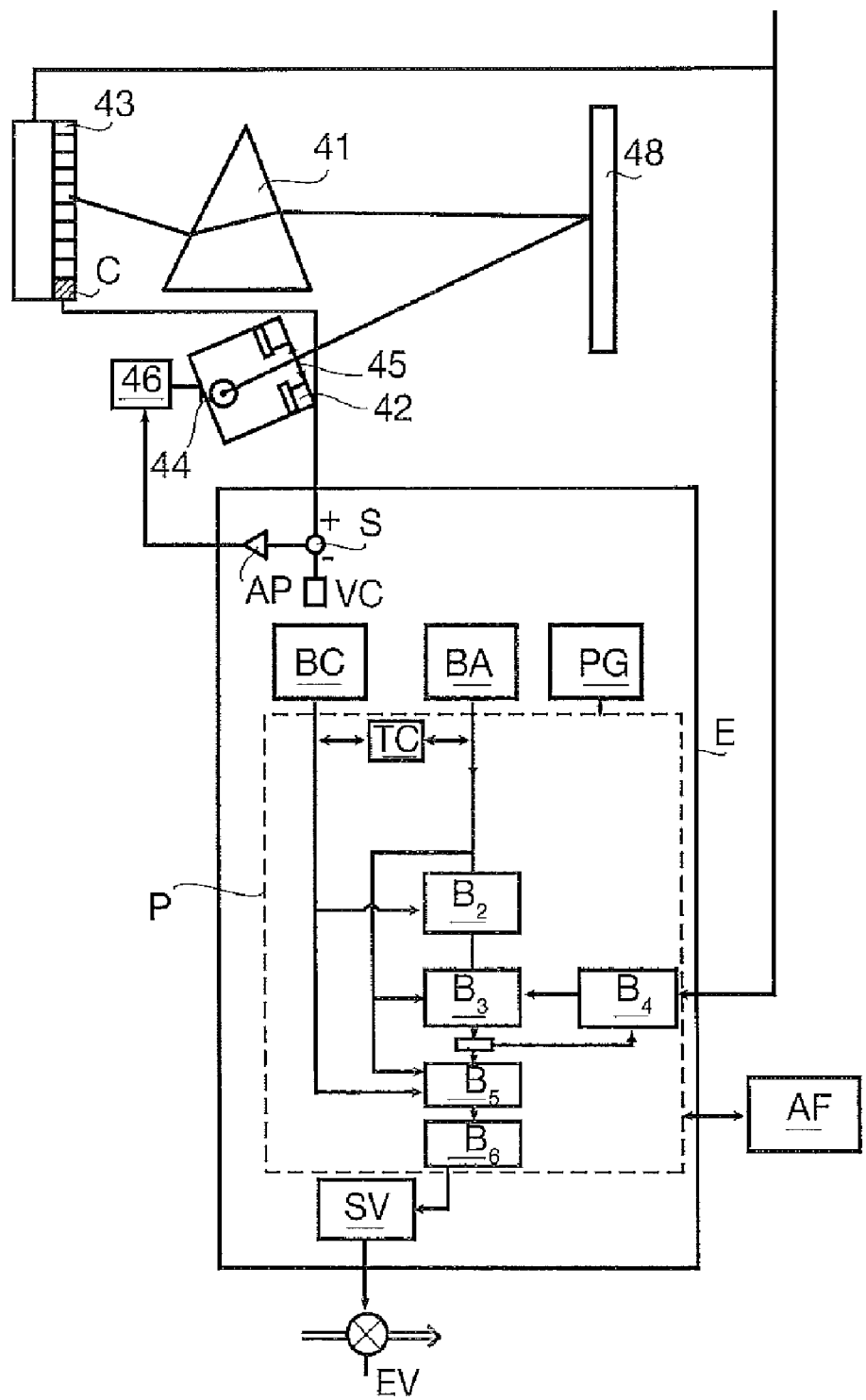
FIG. 4 is a schematic representation of a device for identifying objects or fragments of objects that can be used in the method according to the invention.

As mentioned previously, the purpose of the invention is to allow selective recycling of materials contained in objects that may have a complex structure in which the most diverse materials coexist, some of which may have a high value in terms of recovery or recycling material.

FIGS. 1 and 2 show two objects posing significant recycling problems, it being understood that these two examples are not limitative and that the invention can apply to many other objects.

The object shown in FIG. 1 is an apparatus comprising an electronic circuit housed in a box 1. This electronic circuit is carried by a printed circuit card 2 and comprises a multiplicity of electronic components 3. To this printed circuit there is fixed a transformer 3' comprising a metal armature and copper windings 4. This electronic circuit is connected to a multipin connector 5, the pins 6 of which are gold and/or silver plated.

In accordance with the invention, the first step of the method of recycling this appliance is implemented when the object is produced. This step comprises the marking of the parts of the object containing the materials that it is wished to recycle. In this example, this marking can concern:

The box 1 where it is produced from plastics material. This marking can be carried out in the material itself or possibly on a surface layer (varnish or paint).

For certain electronic components 3 containing rare materials: the marking is incorporated in a surface coating covering the component.

The winding 4 of the transformer: the marking can be incorporated in the layer of varnish covering the copper wire of the winding.

The connection pins: the marking can be carried out the insulating material supporting the pins.

The parts produced from metal having magnetic properties are not marked because of the efficacy of conventional methods.

DESCRIPTION OF THE PREFERRED EMBODIMENTS

Naturally, to each of the other parts that it is wished to recycle there is allocated a specific marker that constitutes an identifier of the material present in this part, which it is wished to recycle.

In the case of the car shown in FIG. 2, the parts that are the subject of marking can comprise:

the components produced from plastics material of the same nature:

a marking can be provided for the bodywork parts made from plastics material (for example the bumpers 7, 8), another marking being able to be provided for the parts made from plastics material situated under the bonnet and/or in the cabin; the corresponding markers can be incorporated in the material, the parts made from cast aluminium, in particular those present in the engine 9 and the wheel rims 10; here also, the marking can be done in the mass or on the surface, the windows and windscreen: the marking is then done in the mass of the glass.

Naturally the list of parts of the objects that are the subject of specific markings are not limitative. This list could therefore be long and give rise to a high number of markers.

To each of these markers there corresponds a material to be recycled as well as data facilitating its spectrophotometric identification.

In accordance with the method according to the invention, the objects that are the subject of marking are collected and stored at the end of their life with a view to carrying out recycling treatments. Naturally, the stock of objects intended for recycling may possibly comprise a mixture of marked objects and non-marked objects. Likewise, these objects can possible be partially dismantled and subjected to prior sorting.

As illustrated in FIG. 3, the objects intended for recycling 12 are brought by a conveyor 13 to a grinding unit 14 that may comprise one or more grinders.

These grinders are designed so as to reduce the objects 12 into particles to be treated 15, having predetermined sizes, it being understood that the grinding unit 14 may comprise several stages and that the particles to be treated 15 may have different sizes distributed in ranges of sizes subject to separate treatments.

In this example, the particles 15 delivered by the grinder are passed through a sorter 16 (indicated schematically by a sieve) that extracts the particles 17 having the required size.

The particles 18 having larger sizes are returned to the grinder 14 by means of a conveyor system 19 indicated schematically by a connection in broken lines.

At the discharge from the sorter 16, the particles 17 having the required size are brought by a conveyor 20 to a detection and extraction station 21. In this detection and extraction station 21, the particles 17 in free fall pass in line with a succession of detection/extraction modules $M_1$, $M_2$, $M_3$, $M_n$ each comprising:

Means 22 of irradiating the particles 17 by light radiation emitted by a generator.

Spectrophotometric analysis means 23 comprising a dispersive element that receives the light transmitted or reflected by the particles 17 and generates a light spectrum of the light intensity in at least several zones of the spectrum corresponding to different ranges of wavelengths.

Means of detecting the light intensity in said zone.

Means of comparing this intensity with one or more threshold values specifically allocated to this zone and which are recorded in memory by virtue of the aforementioned parameters.

Means of determining a code identifying the material to be recycled contained in the particle from the aforementioned identification codes.

Extraction means consisting here of a compressed air injection nozzle 24 connect to a compressed air circuit by means of a solenoid valve.

A circuit controlling the solenoid valve, using previously determined identification codes: this circuit controls the opening of the solenoid valve when the identification code determined corresponds to that of the material that it is wished to recycle.

Means 25 of conveying the extracted particles 26 as far as a storage zone 27.

The particles 28 that have not been extracted in the detection and extraction station are taken over by a conveyor 29 as far as a complementary extraction station 30 that may amongst other things comprise means of extracting particles containing metal elements having magnetic properties.

The magnetic particles extracted 31 are transmitted to a storage area by means of a conveyor 32, while the others are brought to another storage area by another conveyor 33.

In this example, four detection and extraction modules $M_1$, $M_2$, $M_3$, $M_n$ have been shown, it being understood that this number could be different. Each detection and extraction module $M_1$, $M_2$, $M_3$, $M_n$ corresponds to a given marker and therefore to a particular material to be recycled. The extraction, under the effect of the compressed air emitted by the nozzles, is effected by means of deflectors 34 that route the detected particle 26 to the corresponding conveyor.

The spectrophotometric analyses are here carried out by a processing unit 35 that has in memory information relating to the spectra relating to the markers sought. This processing unit also provides the control of the solenoid valves that control the admission of the compressed air to the injection nozzles 24.

The processing unit 35 may possibly be coupled to a reader, for example of the bar code type, intended to identify the objects processed 12 upstream of the grinding unit 14 and to determine, following this identification, the nature of the markers and therefore of the materials to be recycled present in these objects. The control unit can then determine the allocation of each of the detection and extraction modules $M_1$, $M_2$, $M_3$, $M_n$, and possibly proceed with a switching (unit 36) of the particles 26 extracted at these modules to appropriate storage areas.

In the example illustrated in FIG. 4, the spectrophotometer equipping each of the detection and extraction modules comprises:
- a light radiation generator with a long frequency spectrum and adjustable intensity involving a light source 44 supplied by an electric current generator 46 with adjustable power; a collimator 42 in the axis of which a lens 45 is placed, a particle 48 to be treated being situated in the optical axis of the light source 44,
- a dispersive element 41 situated opposite the particle 48, on the same side as the light source 44; this dispersive element 41 (prism or diffraction grating) breaks down the light radiation reflected and/or diffused by the particle 48 according to the frequency in order to produce a spectrum,
- means of detecting the spectrum, here an array of charge transfer detectors 43 that makes it possible to detect the radiation emitted at various spectral levels by the dispersive element 41 and to transmit to an electronic system a digital signal representing the spectrum detected.

As previously mentioned, the light source 44 is a source with broad frequency spectrum. It can consist of arc lamps (of the xenon type) or a bulb generating a white light. It could possible consist of a plurality of laser radiation sources specifically chosen according to the nature of the chemical markers used, an optical mixer then being used to effect a mixing of the different radiations emitted by theses sources.

The lens 45 may for example consist of an achromatic doublet.

Naturally, the electric current generator 46 can also serve for the supply of the electronic circuits associated with the spectrophotometer.

In this example, the array of detectors 43 comprises a cell C situated at a position on the spectrum not affected by the presence of the chemical markers.

This cell C emits a detection signal applied (after amplification) to the input of a subtractor S of a processing unit E, the second input of which receives a calibrated voltage VC. The output of this subtractor S is applied to a power amplifier AP that controls the generator 46 so that the output of the subtractor S is maintained at a constant value, preferably equal to zero.

By virtue of this arrangement, it is ensured that the level of light intensity received by the cell C is constant. There is thus no interference liable to vary the light intensity of the radiation emitted by the particle 48.

The processing unit E comprises a processor P (indicated in broken lines) associated with memory means of a database of the identification codes BC, a spectrophotometric database BA and a program for managing the various processing operations PG, and with display and signalling means AF.

This processor P is designed so as to determine the identification code of the marker carried by the particle 48 and therefore of the corresponding material to be recycled. For this purpose, it determines first of all the spectral zones to be explored (block $B_2$) according to the spectrophotometric data of the database BA. It measures the amplitude of the light radiation received by the detectors in the said spectral zones (block $B_3$).

Where a standard marker is used, this signal may be corrected (block $B_4$) before analysis, using the digital signal produced by the detector corresponding to this standard marker.

The processor P next determines (block $B_5$) the identification code detected, which it compares (block $B_6$) with the predetermined identification code. In the case of a match between these two codes, the processor sends a validation signal SV and demands the opening of the solenoid valve EV in order to obtain the emission of a compressed air jet that switches the particle 48 to a corresponding conveyor.

More precisely, the spectrophotometric analysis of the particle 48 by means of the device previously described can comprises:
- the irradiation of the particle 48 by means of the source of rays 44,
- the transmission of the waves reflected or diffused by the particle 48 on the dispersive element 41, which diverts them differently according to their wavelength,
- the obtaining of a spectrum of the radiation reflected or diffused by virtue of the planar waves thus diverted, which gives, in a detection zone composed of the series of rays 43, a succession of images of the source (block 3),
- the sampling of this spectrum and then the conversion of the analogue signal into a digital signal having a predetermined digital frame (block 4),
- a windowing effected according to the wavelength ranges indicated in the spectrophotometric database, so as to consider only the presence or absence of the characteristic lines of the markers making it possible to determine a code read (block 5),
- the comparison of the data (relating to the identification code) with the experimental data (or code read) so as to effect the identification of the material to be recycled contained in the particle 48 (block 6).

In the case of fluorescent markers, it is possible to envisage proceeding with a second measurement after a time δt in order to check the duration of the fluorescence.

The tracers used may be organic or inorganic. They may be based on rare earths such as dysprosium, europium, samarium, yttrium, etc.

A few markers used and their characteristics are presented by way of example in the following table:

The companies marketing them are in particular "BASF" (registered trade mark), "Bayer" (registered trade mark), "Glowburg" (registered trade mark), "Lambert Rivière" (registered trade mark), "Phosphor Technology" (registered trade mark), "Rhodia" (registered trade mark), SCPI, etc.

| Marker | Excitation wavelength $\lambda_{ex} + \Delta\lambda_{1/2}$ | Wavelength of emission peak |
|---|---|---|
| A | 300 ± 40 | 480 ± 6 |
|   |   | 572 ± 6 |
| B | 300 ± 40 | 562 ± 10 |
|   |   | 601 ± 6 |

-continued

| Marker | Excitation wavelength $\lambda_{ex} + \Delta\lambda_{1/2}$ | Wavelength of emission peak |
|---|---|---|
| C | 335 ± 35 | 470 ± 85 |
| D | 365 ± 70 | 480 ± 90 |
| E | 350 ± 20 | 612 ± 3 |
| F | 380 ± 45 | 480 ± 75 |
| G | 365 | 610 ± 50 |

It should be noted that the markers are not limited to commercial markers but may be synthesised by total synthesis or derived from commercial markers.

An important advantage of the method described above consists of its making it possible to resolve the problems related to the detection and extraction of any materials present in very small quantities within an object and which are not detectable (or can be detected only with great difficulty) by conventional means usable in a selective sorting installation.

Where the material to be recycled is contained in a box, as is the case, for example, with an electronic component, the marker can be provided in a coating applied to the box (for example a varnish or paint).

In the case of a piece made from plastics material not covered with a coating, the marker can be incorporated in the material. Nevertheless, this solution does however pose a problem in the case where the plastics material contains a filler, for example black or dark pigments absorbing light rays. In this case, it will be necessary to use a high-intensity light source emitting in a range of wavelengths in which the absorption of the light radiation is minimum.

If applicable it will be possible to effect a marking in the gel coat layer or in a layer of varnish having reflective properties covering the pigmented plastics material.

The invention claimed is:

1. Method for recycling materials coming from used objects, comprising an operating sequence comprising the following phases:
   a preliminary phase in which a classification of the materials to be recycled is carried out, independently of the objects in which these materials are assumed to be present, with allocation, for each of the materials classified, of an identification code, detectable at a distance without contact,
   a phase of concentration of the materials to be recycled present in the said objects, this phase comprising:
   grinding of the objects into particles with predetermined dimensions according to the nature of said objects and said components,
   detection at a distance of each of the particles, identification of the material to be recycled and the extraction of the particles that were the subject of the detection and identification of a marker, and extraction of the particles that were the subject of the detection and identification, and their switching to a specific storage area for the said material to be recycled,
   wherein:
   identification code signifies the presence of at least one specific chemical marker,
   said method comprising a phase of selective chemical marking of the objects, the parts of objects and/or the components of the objects, including the materials to be recycled, in accordance with allocation made according to said classification,
   detection at a distance comprises detection of chemical markers liable to be carried by each of the particles, identification of the material being made by virtue of the analysis of the marker.

2. Method according to claim 1,
wherein the preliminary phase comprises the entry and storage of spectrophotometric identification data for said markers.

3. Method according to claim 1,
wherein the marking phase is effected when the object is manufactured or during a subsequent step during the life of the objects.

4. Method according to claim 1,
comprising, prior to the extraction phase, the allocation to the markers and therefore to the materials to be recycled of a classification by order of preference, so that, when several markers have been detected on the same particle, this particle is switched by taking account of the marker whose classification is the highest.

5. Method according to claim 1,
wherein the aforementioned chemical markers consist of markers which, when they are excited by an incident light radiation, emit energetic radiation whose frequency spectra are discernable with respect to one another and with respect to the objects and substances in which they are intended to be incorporated.

6. Method according to claim 1,
wherein the aforementioned identification code results from a combination of markers and consists of a binary number, the binary figures of which each correspond to the presence or absence of a marker.

7. Method according to claim 1,
wherein the identification step is performed by spectrophotometric analysis of the objects, particles of objects, components or materials issuing from the aforementioned grinding.

8. Method according to claim 7,
wherein the aforementioned spectrophotometric analysis comprises the following steps:
irradiation of the marked object or particle by means of a light beam with a broad frequency spectrum,
sending of the waves transmitted or reflected by the object or particle onto a dispersive element, which diverts them so as to obtain a light spectrum with a light intensity in different zones of the spectrum corresponding to different wavelength ranges,
detection of the light intensity in each of the said zones,
comparison of this intensity with one or more threshold values specifically attributed to this zone and which were previously recorded in memory,
result of this comparison contributing to the determination of the identification code for the material to be recycled.

9. Method according to claim 8,
wherein the determination of the zones of said spectrum, just like the various parameters allocated to each of these zones, are performed by the system, using the aforementioned spectrophotometric identification data previously stored in memory.

10. Method according to claim 1,
wherein the aforementioned identification code also comprises parameters relating to:
presence or not of fluorescence, and/or
a duration of fluorescence greater than or less than at least one threshold value, and/or
presence or absence of a peak at a pre-established wavelength as well as possibly the amplitude and/or the width of this peak, and/or emission peak heights corresponding to a concentration of markers greater than or less than one or more predefined threshold values.

11. Method according to claim 1,
wherein, in order to increase the number of possible combinations, different combinations of markers are used to obtain lines of different intensity.

12. Method according to claim 8,
wherein the light intensity of the aforementioned beam is slaved according to the difference between the value of the light intensity detected in a predetermined frequency range, not affected by the presence of markers, and a predetermined set value.

13. Method according to claim 1,
wherein one of the markers present in an identification code can be used as a standard serving as a reference for determining the presence, absence and/or intensity of other markers, in particular with a view to effecting corrections and calibrations for being free from noise that may for example result from the composition of the substance or object, variations in positioning such as the angle of incidence, the distance to the object or transparent material enveloping or surrounding this substance or object, or a diminution in the signal due to the presence of foreign bodies or any diminution in the signal resulting from prolonged exposure to weather or to aging of the object.

14. Method according to claim 13, also comprising
prior choice of one of the aforementioned markers and allocation of this marker as a standard to a type of product or substance and/or for a predetermined period of time, allocation to this marker of identification data and data specific to its function as standard and the storage of these data, during an authentication phase, determination of the marker used as a standard, using identification data previously stored, comparison of data relating to this standard marker obtained during the spectrophotometric analysis of the object or particle, with the aforementioned specific data previously stored, calculation of a correction to be made to the spectrophotometric analysis from the result of this comparison, detection of the presence, absence and/or intensity of the markers from the results of the corrected spectrophotometric analysis, determination of the authentication code for the object or substance from the presence, absence and/or intensity of said markers.

* * * * *